United States Patent
Bucknell et al.

(10) Patent No.: US 6,865,387 B2
(45) Date of Patent: Mar. 8, 2005

(54) SOFTWARE RECONFIGURATION OF COMMUNICATIONS APPARATUS

(75) Inventors: Paul Bucknell, Brighton (GB); Stephen M. Pitchers, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 504 days.

(21) Appl. No.: 09/773,422

(22) Filed: Feb. 1, 2001

(65) Prior Publication Data

US 2001/0014603 A1 Aug. 16, 2001

(30) Foreign Application Priority Data

Feb. 15, 2000 (GB) .............................................. 0003313

(51) Int. Cl.[7] .............................................. H04M 3/00
(52) U.S. Cl. ...................... 455/418; 455/418; 455/419; 709/220; 717/168; 370/313
(58) Field of Search .................................. 455/418, 419, 455/420, 426.1, 552.1, 553.1, 412.1; 709/220, 221; 717/168, 177; 370/313, 338

(56) References Cited

U.S. PATENT DOCUMENTS

| | | | | |
|---|---|---|---|---|
| 5,909,437 A | * | 6/1999 | Rhodes et al. ............... | 370/349 |
| 6,088,457 A | * | 7/2000 | Parkinson et al. ........... | 380/270 |
| 6,148,197 A | * | 11/2000 | Bridges et al. ........... | 455/432.3 |
| 6,167,258 A | * | 12/2000 | Schmidt et al. ............. | 455/419 |
| 6,230,194 B1 | * | 5/2001 | Frailong et al. ............ | 709/220 |
| 6,449,476 B1 | * | 9/2002 | Hutchison et al. .......... | 455/418 |

FOREIGN PATENT DOCUMENTS

| | | | | |
|---|---|---|---|---|
| EP | 0804046 A2 | | 10/1997 | |
| WO | WO 9957899 A1 | * | 11/1999 | ............ H04N/7/10 |

OTHER PUBLICATIONS

By M. Cummings and S. Heath, IEEE Communications Magazine, Aug. 1999, pp. 104–106.

* cited by examiner

*Primary Examiner*—Lester G. Kincaid
*Assistant Examiner*—Un C Cho
(74) *Attorney, Agent, or Firm*—Dicran Halajian

(57) ABSTRACT

A method of reconfiguring the software interface in software defined radios in which when a transmitting station (PS) sends a reconfiguration software message to a receiving station (SS), the receiving station responds with a message giving an estimated time duration for carrying-out the reconfiguration of its software. The transmitting station listens for the estimated time duration for a message which confirms that the receiving station has been successfully reconfigured and commences normal communications using the new configuration. The estimated time duration may be computed using indicia present in the reconfiguration software message.

11 Claims, 3 Drawing Sheets

SOFTWARE RECONFIGURATION OF COMMUNICATIONS APPARATUS

The present invention relates to software reconfiguration of a terminal, which may be a fixed primary station or a mobile or portable secondary station, so that it is able to be compatible with the software configuration of another terminal at the other end of a communications link. The present invention has particular, but not exclusive, application to cellular/cordless telephones.

An article "Mode Switching and Software Download for Software Defined Radio: The SDR Forum Approach" by M. Cummings and S. Heath, IEEE Communications Magazine, August 1999, pages 104 to 106, notes that the proliferation of air interfaces has created the need for a standard way of switching services supported by a wireless system and downloading new code to systems in the field. Both conventional and software defined systems need this capability. Various software download scenarios are described in the left hand column of page 106. This article continues by highlighting a number of implementation issues affecting cellular telephony, for example networks administered by different authorities, networks consisting of components from different vendors, the need for mobile terminals to be able to roam between different networks, and the need to keep infrastructure software stable by infrequent software upgrades.

"EP-A2-0 804 046 discloses a method and apparatus for updating the software of a mobile terminal using the air interface. An essential feature of the mobile terminal is that it has two memories capable of storing a data processor program and means for indicating, say by using a flag, which one of the two memories is currently active. Thus, while one of the two memories stores the currently used software, the other of the two memories is updated by storing new infrastructure software. At the appropriate moment the terminal switches from one of the two memories to the other one and thereafter operates in accordance with the new software and the flag is changed over. In the event of the new software being unacceptable, the mobile terminal reverts to the one of the two memories still containing the previously used software. Drawbacks to the solution as taught in this cited specification are that two relatively large memories are required which occupy a relatively large chip area and consequently are costly and also two memories will consume quite a lot of power which will limit adversely the talk/standby time of the mobile terminal."

"While system wide software upgrades are necessary from time to time, there are other occasions when on a one-to-one basis either a fixed primary station or a mobile secondary station need to reconfigure their software interface to suit the software interface of the other of the stations, while leaving unchanged the software interfaces involving the primary station and the others of the mobile stations. Another matter to be addressed is that the mobile terminals operating on a network may be not only of different manufacture but their operational characteristics may differ from one model to another model, even when made by the same manufacturer."

An object of the present invention is to provide a flexible method of reconfiguring part of, if not the entire, software interface between two stations in a communications system.

According to one aspect of the present invention there is provided a method of reconfiguring the software in a communications station, comprising a first communications station transmitting a software reconfiguration message to a second communications station, the software reconfiguration message including indicia which is useable by the second station to estimate how long it takes to reconfigure itself, the second station receiving the message and using the indicia estimates its reconfiguration time, the second station sending the message giving an indication of the reconfiguration time to the first station, and the first station in response to determining the reconfiguration time, waiting until after the time has elapsed before using the reconfigured software in communication with the second station.

In order to enable the station being reconfigured to give an estimate of its reconfiguration time independently of its manufacturer and generation of manufacture, a processor of the receiving station may include a store, such as a ROM, in which the maximum reconfiguration time together with predetermined fractions of this maximum reconfiguration time are stored at pre-specified locations. The indicia in the software reconfiguration message may comprise the location address in the store so that the corresponding reconfiguration time can be read-out. Thus if a station contains a fast processor the prestored time estimates will be relatively short because the maximum reconfiguration time will be relatively short but if the processor is slower then the pre-stored times will be longer because the maximum reconfiguration time will be longer. Thus the system is able to cater for different stations.

In an alternative arrangement, the estimation of the reconfiguration time may be related to the particular layer or layers of the interface software to be reconfigured. The receiving station may include a store, such as a ROM, in which at different storage locations are stored the time estimates for reconfiguring the software in a respective interface layer. The indicia in the software reconfiguration message may comprise the address of the storage location storing the time estimate for reconfiguring the layer specified.

According to a second aspect of the present invention there is provided a software reconfiguration message for transmission from a first station to a second station, the message including indicia which is useable by the second station to estimate the time it will take to reconfigure itself.

"According to a third aspect of the present invention there is provided a communication system comprising a primary station and at least one secondary station. The primary station includes a transceiver, a processor and a store for storing the configuration software of each secondary station. Each secondary station includes a transceiver, a processor, a store for storing configuration software, means for reconfiguring at least some of the configuration software in the store, means for estimating the reconfiguration time on the basis of indicia included in a reconfiguration message transmitted by the primary station, the reconfiguration time being transmitted to the primary station."

According to a fourth aspect of the present invention there is provided a station having a transceiver, a processor, a store for storing configuration software, means, responsive to an external message, for reconfiguring software in the store, and means for estimating a reconfiguration time in response to indicia in the external message and for causing the transceiver to transmit the estimated reconfiguration time.

The teachings of the present invention are also applicable to a mobile secondary station reconfiguring the interface software stored in a fixed base (or primary) station as well as vice versa. Thus a roaming mobile station can enable the base station to adapt its software interface to complement that of the mobile station without requiring a system wide change to be implemented. In the case of cellular and/or cordless telephones, the software reconfiguration messages will normally be transmitted over the air but these message could be transmitted to other software configured apparatus by suitable cables and optical fibres.

The present invention will now be described, by way of example, with reference to the accompanying drawings, wherein.

In the drawings the same reference numerals have been used to indicate corresponding features.

Figure 1:
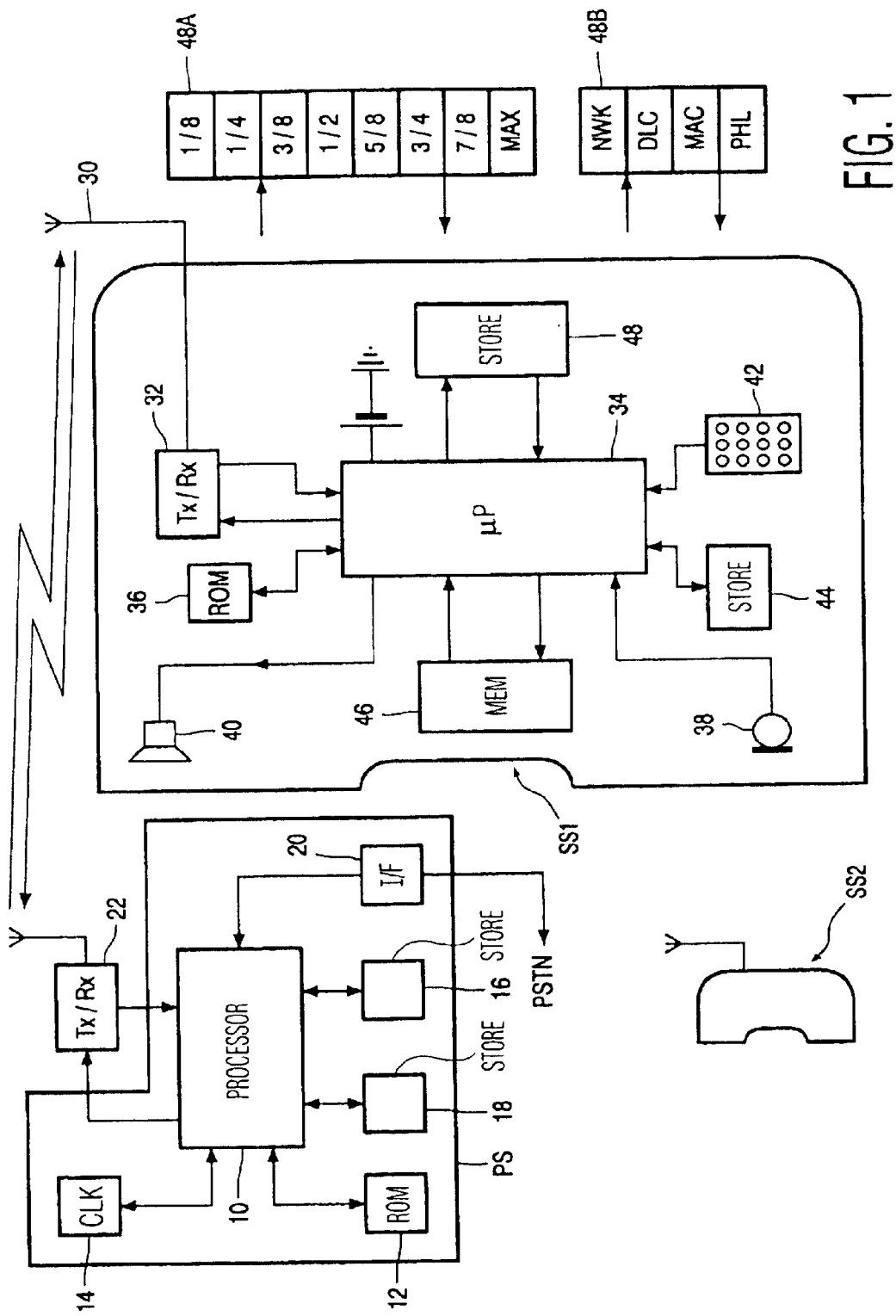
FIG. 1 is a block schematic diagram of a simplified communications system.

For convenience of description, the present invention will be described with reference to a fixed primary station PS transmitting software reconfiguration messages to a mobile or portable secondary station SS. However it is to be understood that a secondary station SS could send software reconfiguration messages to a primary station PS. Also the respective stations could be of equal status.

The cellular telephone communications system illustrated shows a primary station PS which it is assumed is fixedly sited and is capable of operating in accordance with a plurality of air interface protocols, such as GSM (Global System for Mobile Communications) and IS95-code division multiple access (CDMA), and a plurality of software configurable, portable secondary stations SS1, SS2 which are programmable/reprogrammable to operate in accordance a range of air interfaces.

The primary station PS comprises a processor 10 comprising a computer which is programmed to control the operation of the primary station, the programme being held in a program ROM 12. The processor 10 includes a clock 14, an address store 16 for storing the addresses of secondary stations registered on the communications network, a store 18 for storing the user interfaces associated with the respective secondary stations and a PSTN or other landline interface 20 for connecting the primary station PS to the wired telephone network. A plurality of base station radio transceivers 22, only one of which is shown, are connected by landline to ports of the processor 10.

The secondary station SS1 comprises an antenna 30 coupled to a transceiver 32 which in turn is coupled to a microprocessor 34 which operates in accordance with a program stored in a program ROM 36. A microphone 38 and a loudspeaker 40 are coupled to the microprocessor 34 which is able to encode speech for transmission by, and decode speech received by, the transceiver 32. A keypad 42 and a message store 44 are also coupled to the processor 34. Interface software is stored in a non-volatile memory 46, the interface software being programmed/reprogrammed over the air. When reprogramming the interface software in response to the receipt of a reconfiguration message, only portions of it will be changed and as will be described in greater detail later, the method in accordance with the present invention requires a secondary station receiving a reconfiguration message to give an estimate of the time it will need to reconfigure itself. If a network only comprised secondary stations of one type produced by one manufacturer the time or range of times would be known and could be programmed into the primary station PS thereby avoiding the need for the secondary station to send a time estimate. However in real life the secondary stations will be sourced from a range of manufacturers at different times with the result the same reconfiguration task will take different durations to be executed. As a result it would not be practical to store all the estimates of reconfiguration times centrally as it would require a worldwide knowledge of all the different software defined cellular telephones manufactured and yet to be manufactured. Accordingly the secondary station receiving the reconfiguration software generates its own estimate of the time required to alter its software interface.

At the time of manufacture of a secondary station, the manufacturer can measure the time which is required to carry out the various programming/reprogramming tasks and store these in a non-volatile store 48. Thus if the station instructing the reprogramming, in this example the primary station PS, transmits an indication of the extent of programming/reprogramming to be implemented then the secondary station SS can use this to generate a time estimate which is transmitted to the primary station PS. The store 48 could be implemented in several ways. As shown inset as the store 48A, the store could pre-store the maximum time to programme/reprogramme the entire interface software held in store 46 and fractions of this maximum time appropriate to carrying out partial programming/reprogramming. The indication given in the software reconfiguration message could be an address of the storage location storing a particular fraction of, or the entire, maximum time. This time can be read-out and included in a message giving the time estimate.

In an alternative arrangement, the store 48 could be implemented as shown inset at 48B. It is assumed that an air interface protocol consists of different layers, such as Physical Layer (PHL), Medium Access Control Layer (MAC), Data Link Control Layer (DLC) and Network Layer (NWK), and that it is determined at the time of manufacture of the secondary station SS how long it takes to programme/reprogramme each layer. This information is stored in the store 48B. In operation, the indication included in the software reconfiguration message identifies which layer is to be altered and the relevant time estimate can be read-out and included in a message to the primary station PS.

Figure 2:
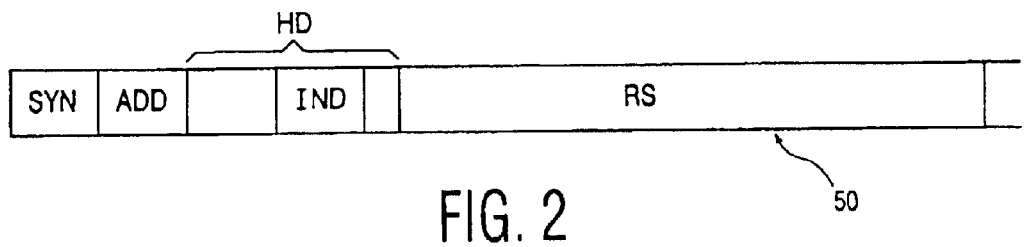
FIG. 2 is a diagram of a reconfiguration message structure.

FIG. 2 illustrates a software reconfiguration message 50 which commences with a synchronising field SYN and is followed by an address ADD of the secondary station, a header HD which includes an indicia field IND which is used to provide an indication of the extent of the reconfiguration, and reconfiguration software RS. Depending on various factors the message 50 can be sent as a single message or as a series of data packets.

Figure 3:
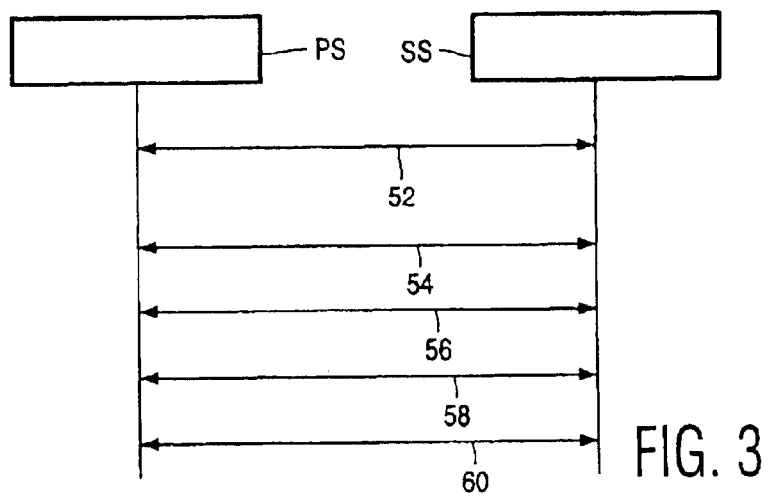
FIG. 3 is a diagram illustrating an exchange of messages between a primary station and a secondary station.

FIG. 3 illustrates a sequence of events when an air interface is being configured. In the drawing the primary and secondary stations are identified by PS and SS, respectively. Double-headed arrow 52 indicates the exchange of information when the secondary station SS is in its standby mode. Double headed arrow 54 indicates the primary and secondary stations being in negotiations over their capabilities. The arrow 56 represents the primary station PS transferring reconfiguration software to the secondary station SS. The arrow 58 represents the secondary station transmitting a message including its estimate of the required reconfiguration time, also termed time window details. Finally double headed arrow 60 represents the primary station PS checking after expiry of the time window to see if the secondary station has reconfigured its software and is using it. The primary station PS has reconfigured itself in the meantime and by the expiry of the time window is ready to commence normal communications using the new configuration.

Figure 4:
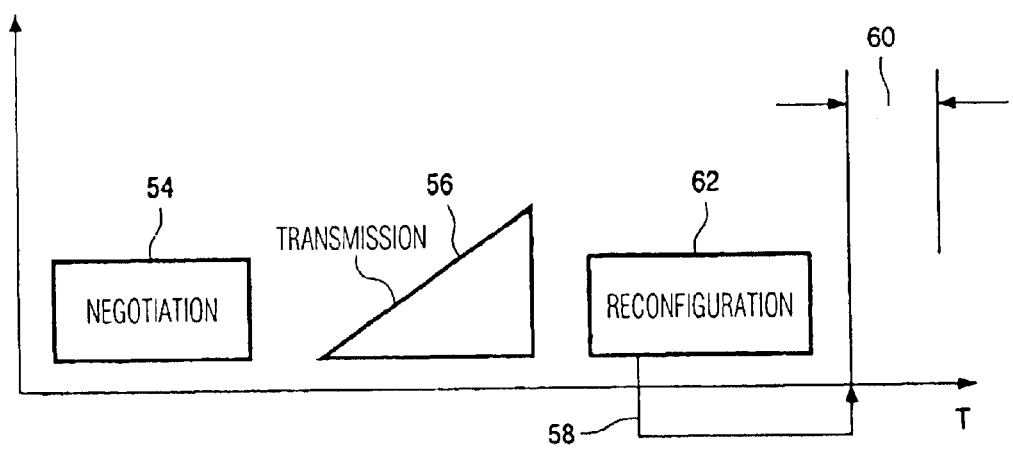
FIG. 4 is a diagram of the time sequence of a reconfiguration event.

FIG. 4 illustrates the just described sequence of events in the time domain. For ease of reference the same reference numerals have been used to indicate the corresponding event, the capability negotiation 54 is followed in time by the transmission of the reconfiguration software 56. Event 62 relates to the secondary station reconfiguring itself after having sent a time window estimate 58 to the primary station. Event 60 is the time window 60 during which the primary station is waiting/listening for confirmation that the reconfiguration has been completed.

Figure 5:
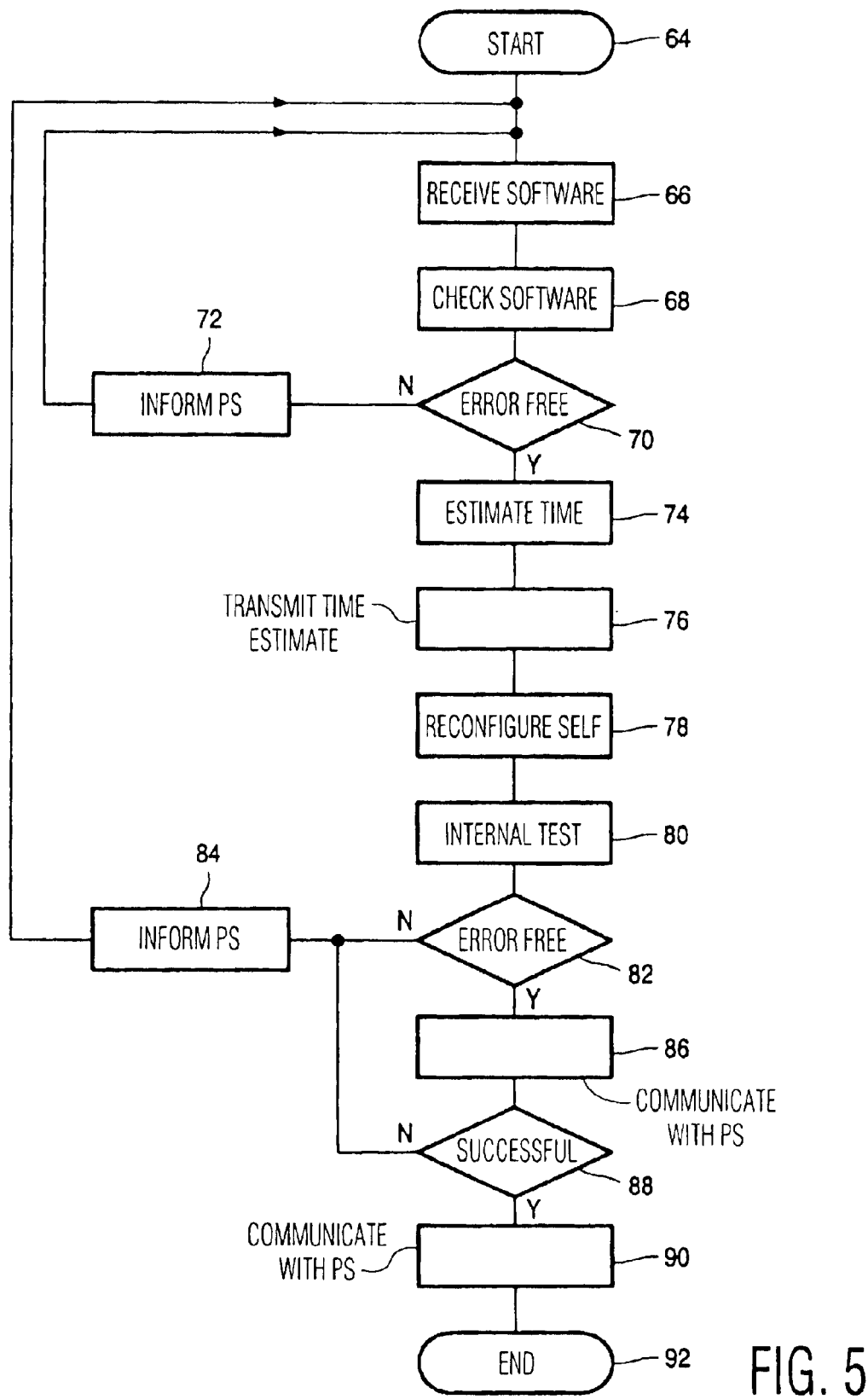
FIG. 5 is a flow chart illustrating the sequence of operations carried out by a secondary station.

The steps carried-out by the secondary station SS are shown in the flow chart illustrated in FIG. 5. Block 64 indicates Start. Block 66 indicates the process of the secondary station SS receiving the reconfiguration software from the primary station PS. Block 68 denotes error checking the received reconfiguration software. The decision block 70 denotes the checking that the received software is error free. If it is not (N), stage 72 represents the secondary station SS informing the primary station PS and the flow chart reverting to the block 66. If the software is error free (Y), block 74 denotes using the indicia IND in the header HD to determine an estimate of the reconfiguration time, that is, the time window. Block 76 relates to the operation of transmitting the estimate (or time window) to the primary station PS, see message 58 in FIGS. 3 and 4. Block 78 denotes the operation of the secondary station SS reconfiguring itself, see also event 62 in FIG. 4. Block 80 relates to the processor in the secondary station testing for internal errors. Decision block 82 relates to deciding if there are no errors. If there are errors (N), block 84 relates to the secondary station SS communicating with the primary station PS using the originally stored software interface. If there are no internal errors (Y), block 86 denotes communicating with the primary station using the newly reconfigured software. Decision stage 88 denotes checking if the communication is successful. If it is not (N) then the flow chart proceeds to the block 84 which denotes using the original software. If it is successful (Y), then block 90 relates to continuing to use the reconfigured interface. Block 92 indicates the end of the flow chart.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of software defined communications apparatus and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of reconfiguring software in a communications system, the method comprising:
   a first communications station transmitting a software reconfiguration message to a second communications station;
   the software reconfiguration message including indicia which is useable by the second station to estimate how long it will take to reconfigure itself;
   the second station receiving the message and using the indicia estimates its reconfiguration time;
   the second station sending a message giving an indication of the reconfiguration time to the first station; and
   the first station, in response to determining the reconfiguration time, waiting until after the time has elapsed before using the reconfigured software in communication with the second station.

2. The method as claimed in claim 1, further comprising: the second station storing the maximum time required for reconfiguration, wherein the indicia sent in the software reconfiguration message is used to determine what proportion of that time will be required to implement the reconfiguration.

3. The method as claimed in claim 2, wherein the maximum reconfiguration time of the second station and fractions of the maximum reconfiguration time are stored in a ROM and the indicia in the software reconfiguration message are used to provide a ROM address.

4. The method as claimed in claim 1, further comprising: the second station storing estimates of reconfiguration times of each software layer of a plurality of software layers, wherein the indicia in the software reconfiguration message relate to a particular software layer to be reconfigured.

5. The method as claimed in any one of claims 1 to 4, wherein, for a plurality of second stations, at least two second stations have different maximum reconfiguration times.

6. The method as claimed in any one of claims 1 to 4, further comprising: the first station reconfiguring its configuration software relating to the software reconfiguration message by the expiry of the reconfiguration time.

7. A communication system, comprising:
   a primary station including
      a first transceiver,
      a first processor, and
      a first store for storing configuration software; and
   at least one secondary station, wherein each secondary station includes
      a second transceiver,
      a second processor,
      a second store for storing configuration software,
      means for reconfiguring at least some of the configuration software in the store,
      means for estimating the reconfiguration time on the basis of indicia included in a reconfiguration message transmitted by the primary station, and
      means for transmitting the reconfiguration time to the primary station.

8. The system as claimed in claim 7, wherein the first processor in the primary station includes timing means for causing the configuration software in respect of the secondary station to be reconfigured by the expiry of the reconfiguration time transmitted by the secondary station.

9. The system as claimed in claim 7, wherein each secondary station includes a non-volatile memory storing at respective locations the maximum software reconfiguration time and predetermined fractions of the said maximum reconfiguration time; and
   wherein the primary station includes means for including a memory location information in said indicia.

10. A station, having comprising:
    a transceiver;
    a processor;
    a store for storing configuration software;
    means, responsive to an external message, for reconfiguring software in the store; and
    means for estimating a reconfiguration time in response to indicia in the external message and for causing the transceiver to transmit the estimated reconfiguration time.

11. The station as claimed in claim 10, further comprising a non-volatile memory storing at respective locations the maximum software reconfiguration time and predetermined fractions of the said maximum reconfiguration time representing estimates, wherein one of said estimates is selected in response to the received indicia.

* * * * *